United States Patent [19]

Potter et al.

[11] Patent Number: 5,261,105
[45] Date of Patent: Nov. 9, 1993

[54] SYSTEM FOR TRANSFERRING BLOCKS OF DATA AMONG DIVERSE UNITS HAVING CYCLE IDENTIFIER SIGNALS TO IDENTIFY DIFFERENT PHASE OF DATA TRANSFER OPERATIONS

[75] Inventors: David Potter, Acton; Thomas J. Moser, Lowell, both of Mass.

[73] Assignee: Thinking Machines Corporation, Cambridge, Mass.

[21] Appl. No.: 518,894

[22] Filed: May 4, 1990

[51] Int. Cl.[5] .................. G06F 13/00; G06F 9/46; G06F 13/14; G06F 13/36
[52] U.S. Cl. .................. 395/725; 395/800; 364/229; 364/229.2; 364/230; 364/230.4; 364/240.1; 364/241.2; 364/242.6; 364/242.92; 364/264.5; 364/DIG. 1
[58] Field of Search .................. 395/325, 800, 725; 364/200

[56] References Cited

U.S. PATENT DOCUMENTS

| | | | |
|---|---|---|---|
| 3,993,981 | 11/1976 | Cassarino et al. | 364/200 |
| 4,229,791 | 10/1980 | Levy et al. | 395/325 |
| 4,381,542 | 4/1983 | Binder et al. | 395/725 |
| 4,488,217 | 12/1984 | Binder et al. | 395/375 |
| 4,543,628 | 9/1985 | Pomfret | 395/275 |
| 4,644,496 | 2/1987 | Andrews | 395/800 |
| 4,698,746 | 10/1987 | Golstein | 364/200 |
| 4,763,249 | 8/1988 | Bomba et al. | 395/325 |
| 4,766,536 | 8/1988 | Wilson, Jr. et al. | 395/325 |
| 4,814,981 | 3/1989 | Rubinfeld | 395/425 |
| 4,984,235 | 1/1991 | Hillis et al. | 370/60 |

OTHER PUBLICATIONS

Thurber, Kenneth J., et al., "A systematic approach to the design of digital bussing structures", Proceedings, 1972 Fall Jt. Comp. Conf, pp. 719-740.

Primary Examiner—Robert B. Harrell
Assistant Examiner—Meng-Ai T. An
Attorney, Agent, or Firm—Richard A. Jordan

[57] ABSTRACT

A data transfer arrangement for use in a data processing system comprising a processing array and at least one input/output unit and a host for issuing commands, including data transfer commands, to both the processing array and the input/output unit. The processing array and input/output unit include interfaces are interconnected by a bus and comprise an information transfer means, a control transfer means including a cycle identifier transfer means, and a transfer control means. The information transfer means transmits and receives information signals, including arbitration, target select and data signals, over information transfer lines of the bus. The cycle identifier transfer means transmits and receives cycle identifier signals over cycle identifier lines of the bus. The transfer control means is connected to the information transfer means and the control transfer means and enables a data transfer in a plurality of phases, including an arbitration phase, a selection phase and a data transfer phase. In particular, the control transfer means enables the information transfer means to transfer over the information transfer lines (i) arbitration signals in response to receipt of cycle identifier signals identifying an arbitration operation by the cycle identifier transfer means to thereby engage in an arbitration operation; (ii) target select signals during a target select phase in response to results of the arbitration operation to thereby engage in a target select operation, and (iii) data signals in response to results of the target select operation.

16 Claims, 9 Drawing Sheets

FIG. 1   MASSIVELY PARALLEL COMPUTER SYSTEM 10

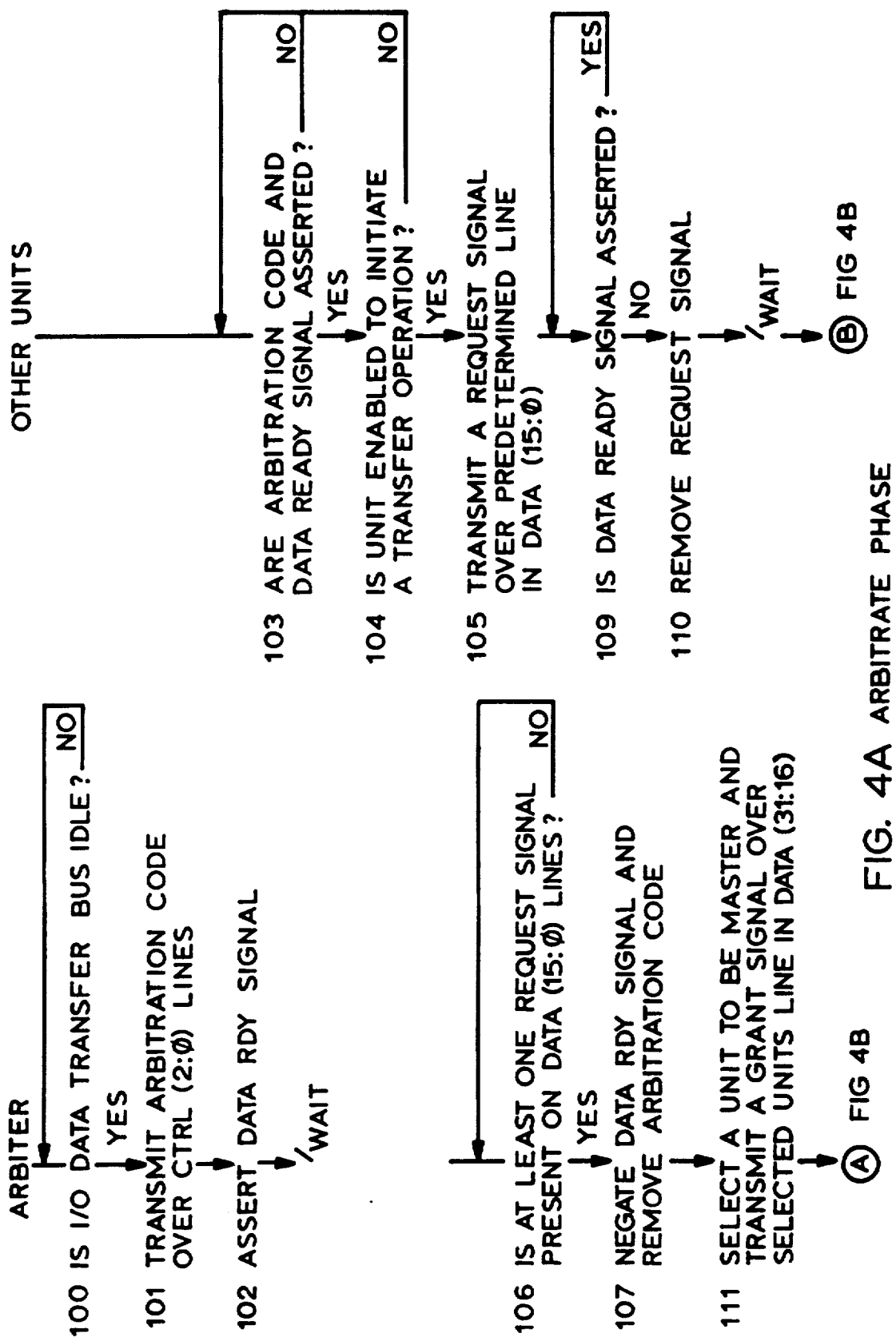
FIG. 4A ARBITRATE PHASE

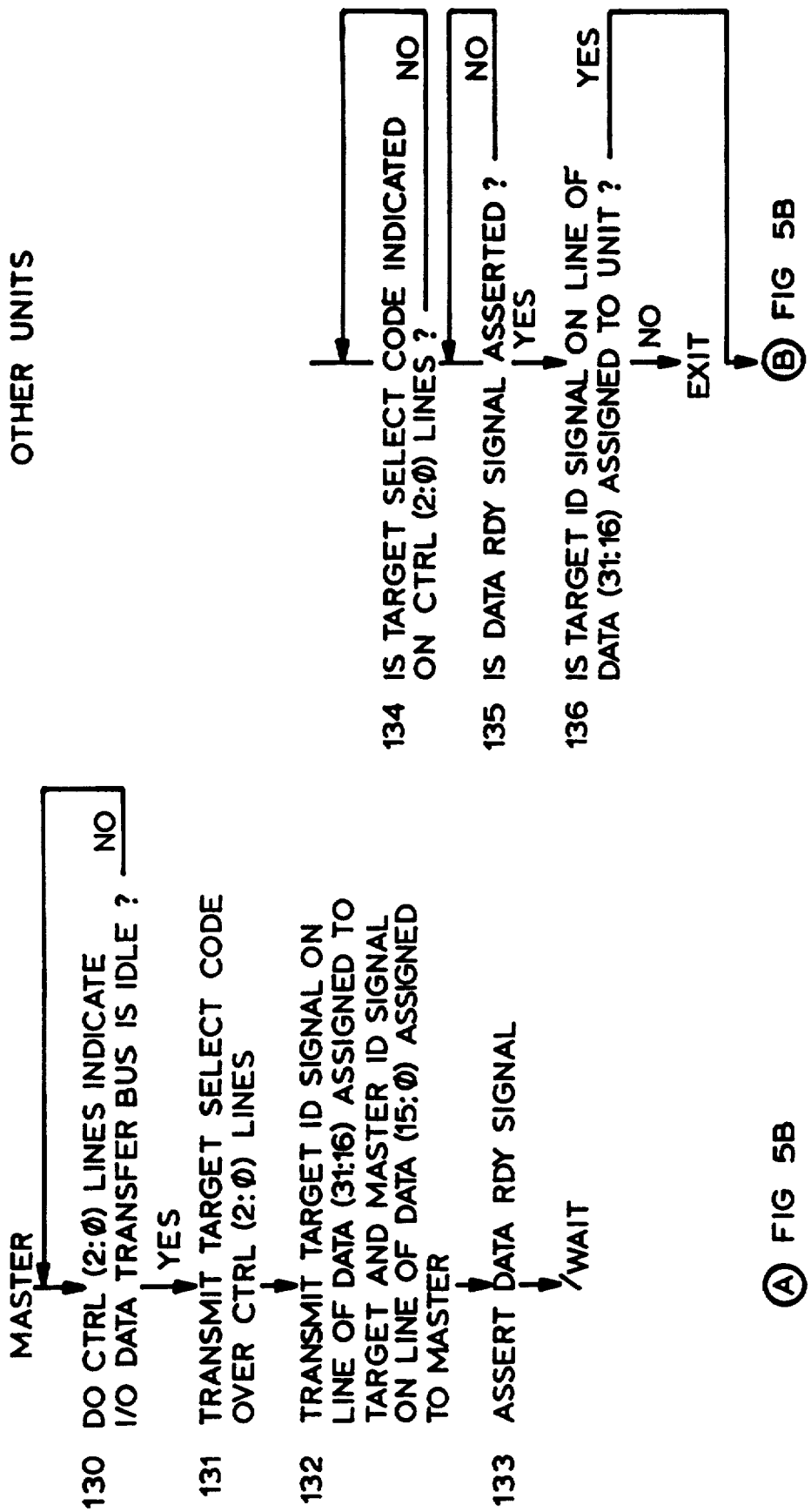

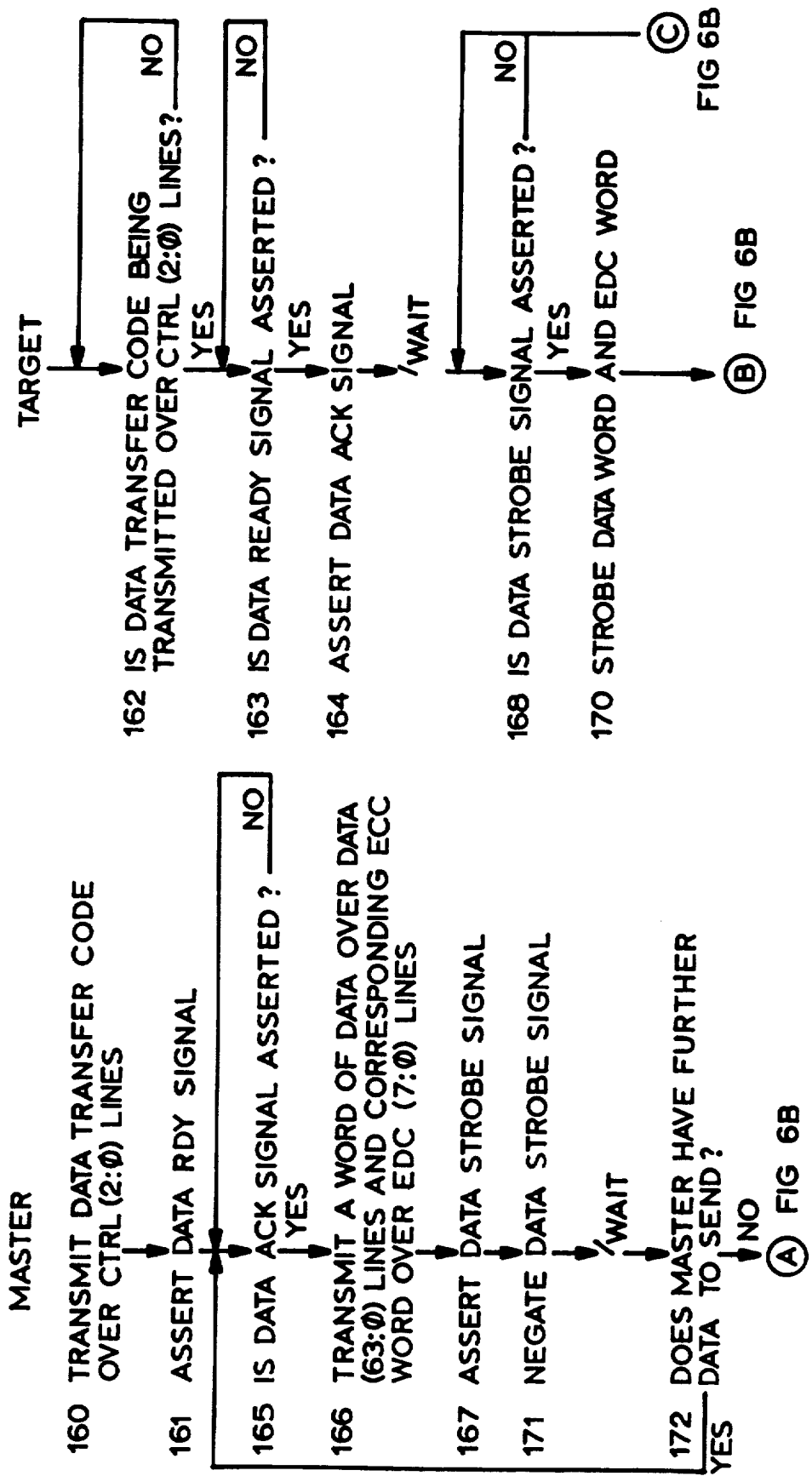
FIG. 6A DATA TRANSFER PHASE

SYSTEM FOR TRANSFERRING BLOCKS OF DATA AMONG DIVERSE UNITS HAVING CYCLE IDENTIFIER SIGNALS TO IDENTIFY DIFFERENT PHASE OF DATA TRANSFER OPERATIONS

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. Pat. No. 4,984,235, issued Jan. 8, 1991, by W. Daniel Hillis, et al, for Method and Apparatus For Routing Message Packets and recording the routing sequence and assigned to the assignee of the present application, (hereinafter identified as "Hillis, et al., '126 patent application) incorporated herein by reference.

U.S. patent application Ser. No. 06/732,353, filed May 8, 1985 now Ser. No. 07/906,006, filed Jun. 26, 1992, by W. Daniel Hillis, et al., for Storage System Using Multiple Mechanically-Driven Storage Units, and assigned to the assignee of the present application, (hereinafter identified as "Hillis, et al., '353 patent application) incorporated herein by reference.

FIELD OF THE INVENTION

The invention relates generally to the field of digital computer systems, and more particularly to arrangements for transferring data among the various elements comprising a digital computer system.

BACKGROUND OF THE INVENTION

A computer system generally includes one or more processors, a memory and an input/output system. The memory stores data and instructions for processing the data. The processor(s) process the data in accordance with the instructions, and store the processed data in the memory. The input/output system facilitates loading of data and instructions into the system, and obtaining processed data from the system.

Most modern computer systems have been designed around a "von Neumann" paradigm, under which each processor has a program counter that identifies the location in the memory which contains the its (the processor's) next instruction. During execution of an instruction, the processor increments the program counter to identify the location of the next instruction to be processed. Processors in such a system may share data and instructions; however, to avoid interfering with each other in an undesirable manner, such systems are typically configured so that the processors process separate instruction streams, that is, separate series of instructions, and sometimes complex procedures are provided to ensure that processors' access to the data is orderly.

In Von Neumann machines instructions in one instruction stream are used to process data in a single data stream. Such machines are typically referred to as SISD (single instruction/single data) machines if they have one processor, or MIMD (multiple instruction/multiple data) machines if they have multiple processors. In a number of types of computations, such as processing of arrays of data, the same instruction stream may be used to process data in a number of data streams. For these computations, SISD machines would iteratively perform the same operation or series of operations on the data in each data stream. Recently, single instruction/multiple data (SIMD) machines have been developed which process the data in all of the data streams in parallel. Since SIMD machines process all of the data streams in parallel, such problems can be processed much more quickly than in SISD machines, and at lower cost than with MIMD machines providing the same degree of parallelism.

The aforementioned Hillis patents and Hillis, et al., '126 patent application disclose an SIMD machine which includes a host computer, a micro-controller and an array of a large number of processing elements, each including a bit-serial processor and a memory. The host computer, inter alia, generates commands which are transmitted to the micro-controller. In response to a command, the micro-controller transmits one or more SIMD instructions to the array, each SIMD instruction enabling all of the processing elements to perform the same operation in connection with data stored in the elements' memories.

One problem with using a SIMD machine is loading data into the array and retrieving processed data from the array. Normally, the data to be loaded in provided by a data source, such as a mass storage system described in the aforementioned Hillis, et al., '353 patent application. Processed data retrieved from the array may be stored in a similar mass storage system, or it may be transferred to other input/output systems, such as a frame buffer which can provide a video image of the output. In the past, buses providing connections between an array and a mass storage system, or other input/output system, have been point-to-point between the array and one other system, which provides limited flexibility in transferring data.

SUMMARY OF THE INVENTION

The invention provides a new and improved arrangement for performing data transfers, in particular of blocks of data, among units comprising a massively parallel digital data processing system.

In brief summary, the arrangement includes an interface, for use in a processing array and at least one input/output unit and a host for issuing commands, including data transfer commands, to both the processing array and the input/output unit. The interfaces are interconnected by a bus. Each interface comprises an information transfer means, a control transfer means including a cycle identifier transfer means, and a transfer control means. The information transfer means transmits and receives information signals, including arbitration, target select and data signals, over information transfer lines of the bus. The cycle identifier transfer means transmits and receives cycle identifier signals over cycle identifier lines of the bus. The transfer control means is connected to the information transfer means and the control transfer means and enables a data transfer in a plurality of phases, including an arbitration phase, a selection phase and a data transfer phase. In particular, the control transfer means enables the information transfer means to transfer over the information transfer lines (i) arbitration signals in response to receipt of cycle identifier signals identifying an arbitration operation by the cycle identifier transfer means to thereby engage in an arbitration operation; (ii) target select signals during a target select phase in response to results of the arbitration operation to thereby engage in a target select operation, and (iii) data signals in response to results of the target select operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4A through 6B are detailed flow diagrams illustrating the detailed operations performed in transferring data over the bus depicted in FIG. 3.

DETAILED DESCRIPTION OF AN ILLUSTRATIVE EMBODIMENT

Figure 1:
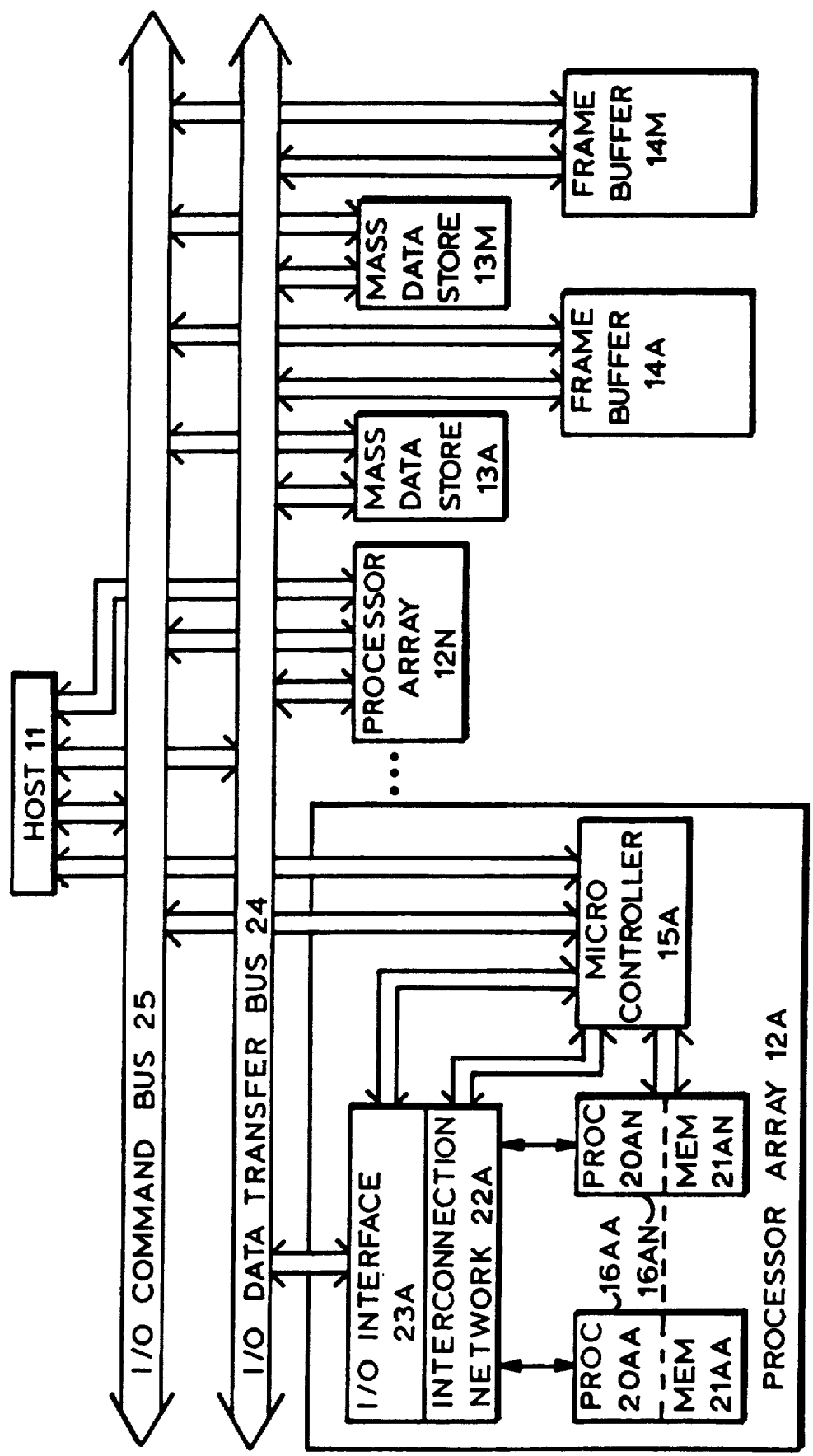
FIG. 1 is a general block diagram of a massively parallel computer system constructed in accordance with the invention.

FIG. 1 is a general block diagram of a massively parallel computer system 10 constructed in accordance with the invention. With reference to FIG. 1, the system 10 includes at least one host 11 which controls one or more processor arrays 12A through 12N generally identified by reference numeral 12(i), mass data store subsystems 13A through 13M generally identified by reference numeral 13(j), and other input/output subsystems such as frame buffers 14A through 14K, identified by reference numeral 14(k).

A processor array 12(i) in system 10 may be similar to that described in the aforementioned Hillis patents and Hillis, et al., '126 patent application. In one embodiment, a processor array 12(i) includes a micro-controller 15(i) which receives data processing commands from the host 11 to control processing by a processor array 12(i). The processor array 12(i) includes a number of processing elements 16(i)A through 16(i)N, generally identified by reference numeral 16(i)(j), each including a processor 20(i)(j) and a memory 21(i)(j), which actually perform the processing under control of the micro-controller 15(i). The micro-controller 15(i) enables the processors 20(i)(j) to, in parallel, process items of data in their respective memories 21(i)(j).

In addition, the micro-controller 15(i) controls an interconnection network 22(i) which transfers data among the processing elements 16(i)(j) and an input/output interface 23(i) which transfers data between the processing elements 16(i)(j) and an input/output data transfer bus 24 for transfer to other units in the system 10. In particular, the input/output interface 23 facilitates the transfer of data between the processing elements 16(i)(j) of its processor array 12(i) and the mass data stores 13(i), frame buffers 14(i) and other input/output units (not shown) in the system 10.

A suitable mass data store 13(i) for use in system 10 may be similar to that described in the aforementioned Hillis, et al., '353 patent application. Such a mass data store 13(i) comprises an array of independent disk drives which store bits, in parallel, from words of data transferred over the input/output data transfer bus 24. In one particular embodiment, in which a word transferred over the input/output data transfer bus comprises sixty-four bits, and thirty-two disk drives are provided in a mass data store 13(i), two bits from each word are stored on each disk drive. Additional independent disk drives are provided to store error correction and detection bits for each of the words stored on the other disks. While such a mass data store can provide a number of advantages in the system 10, as described in the Hillis, et al., '353 patent application, providing enhanced reliability and accessibility of the data, and increased speed of storage and retrieval of the data, it will be appreciated that other, conventional types of mass data storage subsystems may be used for one or more of the mass data stores 13(i).

A frame buffer 14(i) may comprise any conventional frame buffer or video terminal for creating an image from data provided over the input/output data transfer bus 24. Since such frame buffers 14(i) are conventional they will not be described further. The system 10 may also have other types of input/output subsystems, such as printers, plotting devices or other devices for creating hard-copy output, interfaces to telecommunications lines, and so forth.

As noted above, the host 11 transmits data processing commands to the processor arrays 12(i), and in particular to the respective micro-controllers 15(i), to initiate processing thereby. The host 11 may transmit such commands over direct connections to the micro-controllers 15(i). The host 11 may also transmit a data transfer command, to enable a processor array 12(i) to engage in a output data transfer operation, to the micro-controller 15(i) over the direct connection therebetween. Alternatively, the host 11 and processor array 12(i) may be connected to an input/output command bus 25, which the host 11 may use to transfer data transfer commands to the processor array 12. In addition, the host 11 transmits a data transfer command to an input/output subsystem, such as a mass data store 13(i) or frame buffer 14(i), over the input/output command bus 25 to enable it to engage in a data transfer operation.

The input/output command bus 25 may take any conventional form; in one particular embodiment, it comprises an Ethernet network over which the various units connected thereto transmit and receive command and status information in the form of packets. The types of command and status information, and the form of the respective packets, may take any particular or conventional form. The command information may include, for example, the type of operation, that is, whether data is being transferred over the input/output data transfer bus 24 to or from the unit that receives the command packet, and the amount of data to be transferred. If the unit is to obtain the data from, or provide it to, particular storage locations therein, the addresses of the storage locations may also be provided. In addition, the particular unit to which data is to be transferred, or from which data will be received, is identified in the command packet.

Figure 2:
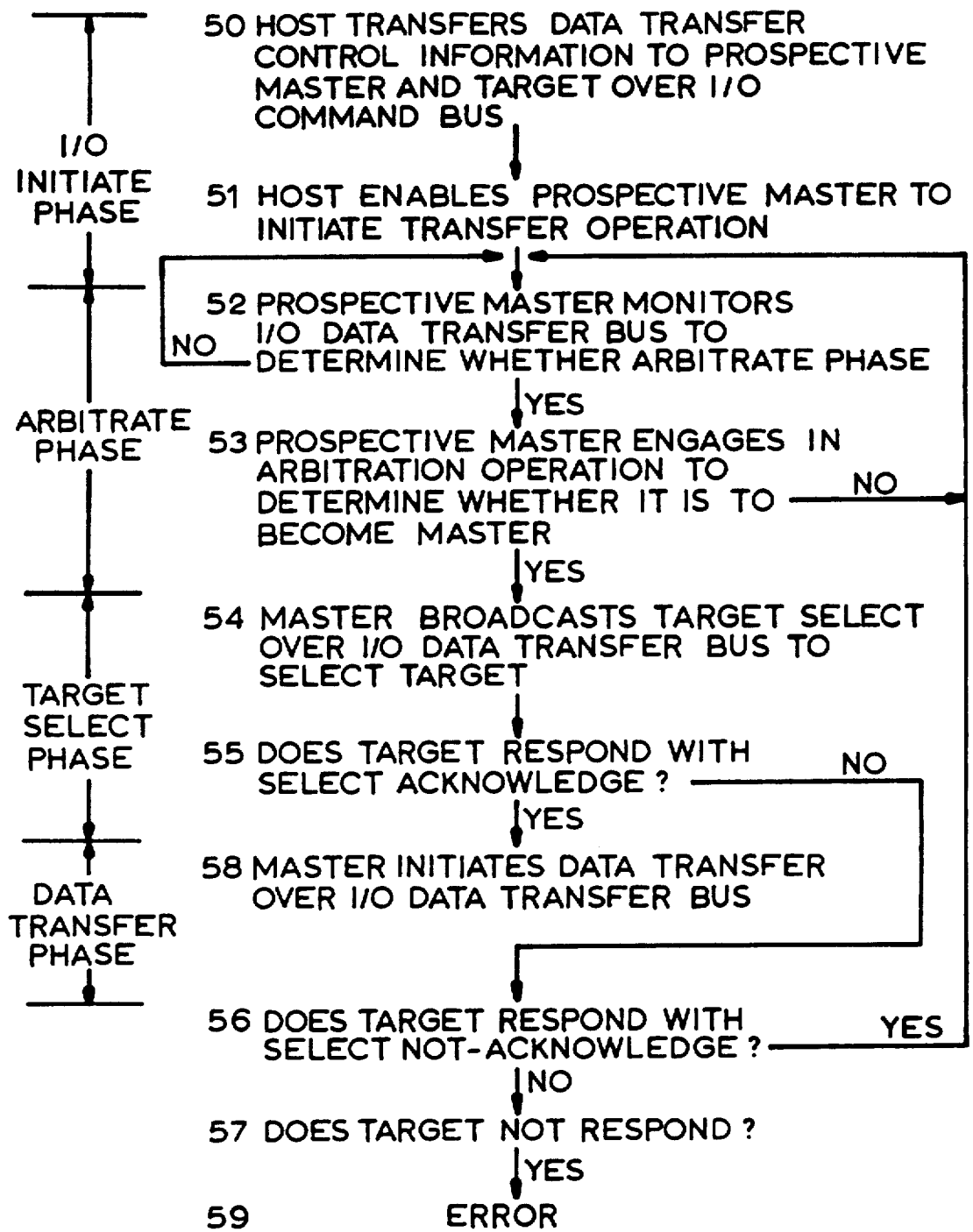
FIG. 2 is a flow diagram useful in understanding operations performed by the components comprising the system depicted in FIG. 1 in connection with transfer of data therebetween.

The general operations performed by the various units comprising system 10 in connection with a data transfer over input/output data transfer bus 24 are depicted in the flow chart in FIG. 2. Preliminarily, a data transfer operation comprises four general phases, including an initiation phase, an arbitration phase, a target select phase and a data transfer phase. In the initiation phase, the host 11 transfers the data transfer control information over the input/output command bus 25 to the units of the system 10 to engage in a data transfer operation (step 50). The host 11 then enables one of the units, which will be a master unit in the transfer, to initiate the data transfer operation over the input/output data transfer bus 24 (step 51). The other unit to engage in the data transfer operation is identified as the target unit. It will be appreciated that the host 11 may transfer data transfer control information to initiate several data transfer operations contemporaneously; the particular sequence in which the data transfers operation are thereafter performed will depend upon results of the subsequent arbitration phase and target select phase.

The detailed operations performed during the arbitrate phase will be described below in connection with FIGS. 4A and 4B. In brief, while the host 11 controls the timing of the input/output initiation phase, one of the units, which is selected to be an arbiter, controls timing of, and initiates, the arbitration phase. The arbiter may be any unit connected to the input/output data transfer bus 24 and may be enabled as arbiter by any conventional mechanism. For example, one unit may be selected as arbiter by means of an appropriate jumper connection. Alternatively, the host 11 may, at initialization of the system 10, establish one of the units as arbiter, or the units may pass arbitership around in the system in a round-robin or other fashion.

In any event, after receiving data transfer control information from the host 11, the units that will be the master unit in a respective data transfer operation wait until the arbiter initiates an arbitration phase (step 52). When the arbiter initiates an arbitration phase, it sends a notification thereof over the input/output data transfer bus 24 to the other units connected to the 24. Upon receipt of an arbitration notification from the input/output data transfer bus, the prospective master units in the pending data transfer operations, along with the arbiter, engage in an arbitration operation. The arbiter selects one of the prospective master units as master unit, and sends a notification thereof to the selected master unit (step 53). The prospective master units that are not selected as master unit return to step 52, and engage in an arbitration operation during a subsequent arbitration phase. The selected master unit (step 53) sequences to the target select phase.

The detailed operations performed during the target select phase will be described below in connection with FIGS. 5A and 5B. In brief, during the target select phase, the master unit broadcasts a target select message over the input/output data transfer bus, identifying the other unit to engage in the data transfer operation as target unit, and identifies itself as master unit (step 54). One of three consequences may occur in response to step 54, which are identified as steps 55 through 57. The unit identified as the target unit receives the target select message and the master unit identification and compares the master unit identification received in the target select message to the master unit identified in the data transfer control message it received from the host 11 during the input/output initiate phase to determine whether they correspond. If so, the target responds with an select acknowledge (step 55), and the units proceed to the data transfer phase.

The detailed operations performed during the data transfer phase will be described below in connection with FIGS. 6A and 6B. In brief, if the unit identified as target unit makes a positive determination in step 55, it then comprises the target unit, and provides a suitable indication to the master unit. In that case, the units proceed to the data transfer phase. During the data transfer phase, the master unit initiates the actual data transfer with the selected target unit (step 56).

On the other hand, if the unit identified as target unit determines that the master unit identification it received in the target select message in step 54 does not correspond to the master unit identified in the data transfer control message received from the host during the input/output initiate phase, it responds with a select not-acknowledge (step 56), and the units return to the arbitrate phase. Finally, it will be appreciated that the master unit may not receive any response from the identified target within a predetermined time-out period. In that case, it may signal the host 11 that an error has occurred.

Figure 3:
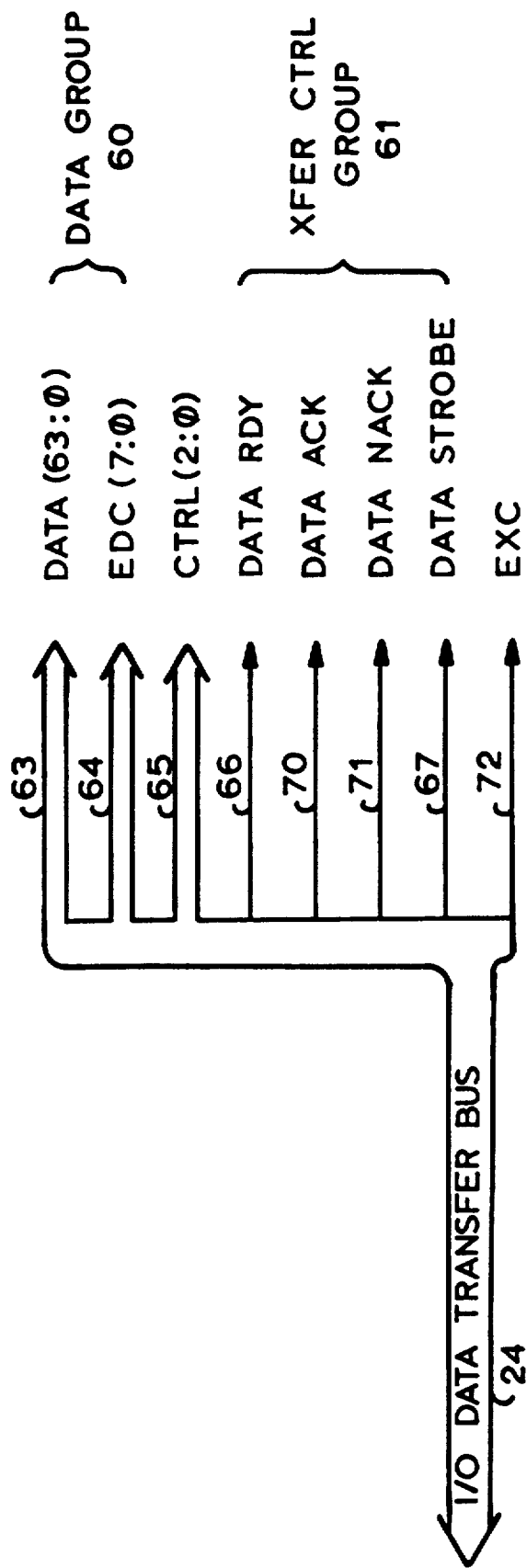
FIG. 3 is a diagram detailing the various lines of the bus depicted in FIG. 1 used to transfer data.

Before proceeding to a description of the detailed operations performed during the arbitrate, target select and data transfer phases, it would be helpful to describe the detailed structure of the input/output data transfer bus 24, which is depicted in FIG. 3. With reference to FIG. 3, the input/output data transfer bus 24 includes a plurality of lines divided into two primary functional groups, namely, a data group 60 and a transfer control group 61. The data group 60 includes lines 63 which carry DATA (63:0) signals and lines 64 which carry EDC (7:0) error detection code signals. In one particular embodiment, each of the lines carrying one of the EDC (7:0) error detection code signals provides parity protection for a corresponding eight-bit byte of the DATA (63:0) signals.

The lines comprising the transfer control group 61 control the timing of signal transfer over the lines 63 and 64. In addition, the lines comprising the transfer control group are used to identify the particular phases, in particular the arbitration, target select and data transfer phases, of transfers over the input/output data transfer bus 24. The transfer control group 61 includes lines 65 which carry CTRL (2:0) control signals, which, in turn, identify the phases during a data transfer operation. The transfer control group further includes lines 66 and 67 that carry, respectively, a DATA RDY data ready signal and a DATA STROBE signal. These lines are driven by the unit that transmits the CTRL (2:0) control signals over the lines 65 to control timing of transfers of signals over the lines comprising the data group 60. In addition, the transfer control group 61 includes two lines 70 and 71, which carry DATA ACK acknowledgement and DATA NACK negative-acknowledgement signals, that are driven during the target select and data transfer phases to provide selected status information during the respective phase.

Finally, the input/output data transfer bus 24 includes a line 72 that carries an EXCEPTION signal which may be transmitted by any unit to indicate the existence of selected error conditions.

With this background, a detailed explanation of the operations performed during the arbitrate, target select and data transfer phases will be presented in connection with FIGS. 4A through 6B. With reference to FIG. 4A, in the arbitrate phase the unit assigned to be arbiter monitors the input/output data transfer bus 24 to determine whether it is in an idle condition (step 100). The input/output data transfer bus 24 is in the idle condition when the CTRL (2:0) control signals on lines 65 are negated, which, in turn, indicates that no signals are present on the lines 63 and 64 comprising the data group 60. When the arbiter determines, in step 100, that the input/output data transfer bus is idle, it asserts CTRL (2:0) control signals over the lines 65 comprising an arbitrate code (step 101) and asserts the DATA RDY data ready signal on line 66 to begin an arbitration operation.

In response to the DATA RDY data ready signal, the other units connected to the input/output data transfer bus receive the CIFRL (2:0) control signals on lines 65 and decode them (step 103). The units, including the arbiter, then determine whether they have been enabled by the host 11 to initiate a data transfer over the input/output data transfer bus 24 (step 104). If a unit, including the arbiter, determines that it has been enabled to initiate a data transfer, it energizes a predetermined one of the lines 63 which carry the DATA (15:0) signals (step 105) as an asserted request signal. Each unit is assigned a different one of the lines, and assertion of a request signal on a particular line uniquely identifies the unit.

After asserting the DATA RDY data ready signal on line 66, the arbiter monitors the lines 63 which carry the DATA (15:0) signals until one of the lines is energized (step 106), indicating assertion of a request signal. It will be appreciated that the time between assertion by the arbiter of the DATA RDY data ready signal and receipt of an asserted request signal may vary. If, for example, the host 11 has enabled any transfer operations before the beginning of the arbitration phase, the units to be master unit in those transfer operations may assert their request signals immediately upon receipt of the asserted DATA RDY data ready signal.

On the other hand, if there are no pending transfer operations when the arbiter begins the arbitration phase, a unit will not assert its request signal until it is enabled by the host 11 and so some time may elapse between the beginning of the arbitration phase and assertion of a request signal. During this time, the arbiter will, unless it is enabled to initiate a transfer operation, maintain the arbitration code on the control lines 65 and the DATA RDY data ready signal asserted. If the arbiter itself is so enabled, it, like any other unit connected to the input/output data transfer bus 24, will energize its assigned one of the DATA (15:0) lines to assert its request signal thereby indicating its request.

In any event, some time after the beginning of the arbitrate phase, a unit (possibly including the arbiter) will assert its request signal on lines 63. A selected time after detecting assertion of a request signal, the arbiter negates the DATA RDY data ready signal and removes the arbitration code from lines 65 (step 107), indicating the end of the arbitration operation. The units, including the arbiter, maintain their request signals on the respective ones of the data lines 63 until they determine that the DATA RDY signal has been negated (step 109) at which point they remove their request signals from the lines 63 (step 110). The arbiter then selects one of the units (which may include itself) to be master unit during the succeeding target select and data transfer phases (step 111). The selection may be based on any selection criteria. In one particular embodiment, selection is based on a modified round-robin scheme, in which priority generally rotates among the units connected to the input/output data transfer bus 24.

When the arbiter selects a unit to be the master unit, it energizes one of the lines 63, over which the DATA (31:16) data signals are transferred, as a grant signal (step 112). The arbiter performs step 112 even if it is the selected unit. The energized line is uniquely associated with the selected unit, that is, the unit selected to be master unit during the succeeding target select and data transfer phases. In addition, the arbiter asserts CTRL (2:0) control signals over the lines 65 comprising a grant code (step 111, FIG. 4B), asserts the DATA RDY data ready signal (step 113) and waits for assertion of the DATA ACK data acknowledge signal. It will be appreciated that the arbiter, if it does not receive an asserted DATA ACK data acknowledge signal within a predetermined time-out period, may indicate an error condition by an appropriate signal to the host 11 over the input/output command bus 25, or by assertion of the EXC exception signal on line 72.

Each unit transmitting the request signals, when it detects the grant code on the lines 65 and the asserted DATA RDY data ready signal (step 114), determines whether the arbiter is transmitting the grant signal over its respective one of lines 63 (step 115). Those nonselected units, that is which determine, in step 115, that the grant signal is not being transmitted over their respective lines 63, exit, and may return to step 103 for a subsequent arbitration phase. The selected unit asserts the DATA ACK data acknowledge signal on line 70 (step 116).

After asserting the DATA RDY data ready signal in step 113, the arbiter waits for the assertion of the DATA ACK data acknowledge signal (step 117), at which point it negates the DATA RDY data ready signal on line 66 (step 120). The selected unit monitors the DATA RDY data ready signal until it is negated (step 121) and then negates the DATA ACK data acknowledge signal (step 122). The arbiter then removes the CTRL (2:0) signals comprising the grant code from the control lines 65 (step 123) and removes the grant signal from the lines 63 (step 124). Thereafter, the selected unit proceeds to the target select phase.

It will be appreciated that the arbiter, after asserting the DATA RDY data ready signal, may implement a timer (not shown) that times out a predetermined time after the assertion of the DATA RDY data ready signal if the DATA ACK data acknowledge signal has not been received. If the timer times out before the arbiter receives an asserted DATA ACK data acknowledge signal, it can indicate an error condition by an appropriate signal to the host 11 over the input/output command bus 25 or by assertion of the EXC exception signal on link 72. Thereafter, the arbiter can return to the beginning of the arbitration phase.

The operations performed during the target select phase will be described in connection with FIGS. 5A and 5B. In brief, during the target select phase, the unit selected during the arbitrate phase, which will be the master unit, selects another unit as a target unit. The target unit verifies that the host 11 has enabled it to engage in a data transfer operation with the master unit. If it is, it provides a suitable notification to the master unit. The target unit then becomes a slave unit and the master unit and slave units proceed to the data transfer phase. On the other hand, if the target unit determines that the host 11 has not enabled it to engage in a data transfer operation with the master unit, it so notifies the master unit, and the two do not proceed to the data transfer phase. Instead, the units return to the arbitration phase. Finally, if the master unit receives no response from the target unit before the end of a predetermined time-out period, it will notify the host 11, over another channel, such as the input/output command bus 25, that an error has occurred and thereafter return to the transfer initiation phase.

With reference to FIG. 5A, the unit selected to be master unit during the arbitration phase initially checks the CTRL (2:0) control signals on the lines 65 to determine whether the input/output data transfer bus 24 is idle (step 130). When the input/output data transfer bus 24 is idle, the master unit transmits CTRL (2:0) control signals over lines 65 comprising a target select code (step 131), a target unit identification signal over one of the lines 63 over which DATA (31:16) signals are transmitted, and a master unit identification signal over one of the lines 63 over which DATA (15:0) signals are transmitted (step 132). During the target select phase, each unit has assigned two of lines 63, one in the lines over which DATA (31:16) signals are transmitted, and a second in the lines over which DATA (15:0) signals are transmitted. The master unit transmits the target unit identification signal by energizing one of the lines 63, over which the DATA (31:16) signals are transmitted, that is assigned to the target unit. In addition, the master unit transmits the master unit identification signal by energizing one of the lines 63, over which the DATA (15:0) signals are transmitted, that is assigned to it. The master unit then asserts the DATA RDY data ready signal (step 133), and waits for a response. It will be appreciated that, if the unit does not receive either an asserted DATA ACK data acknowledge signal or a DATA NACK data not-acknowledge signal within a predetermined time-out period, it will indicate an error condition by an appropriate signal to the host 1 1 over the input/output command bus 25, or by assertion of the EXC exception signal on line 72. The master unit then returns to the transfer initiation phase.

If the other units connected to the input/output data transfer bus 25 determine that the CTRL (2:0) control signals on line 65 comprise the target select code (step 134), upon assertion of the DATA RDY signal by the master unit (step 135), they examine the CTRL (2:0) control signals on lines 65 and determine that they identify the target select phase. In addition, each of the other units determine whether the target unit identification signal identifies itself, that is, whether its one of the lines 63 assigned to the DATA (31:16) signals is energized (step 136). If not, the unit exits.

Figure 5B:
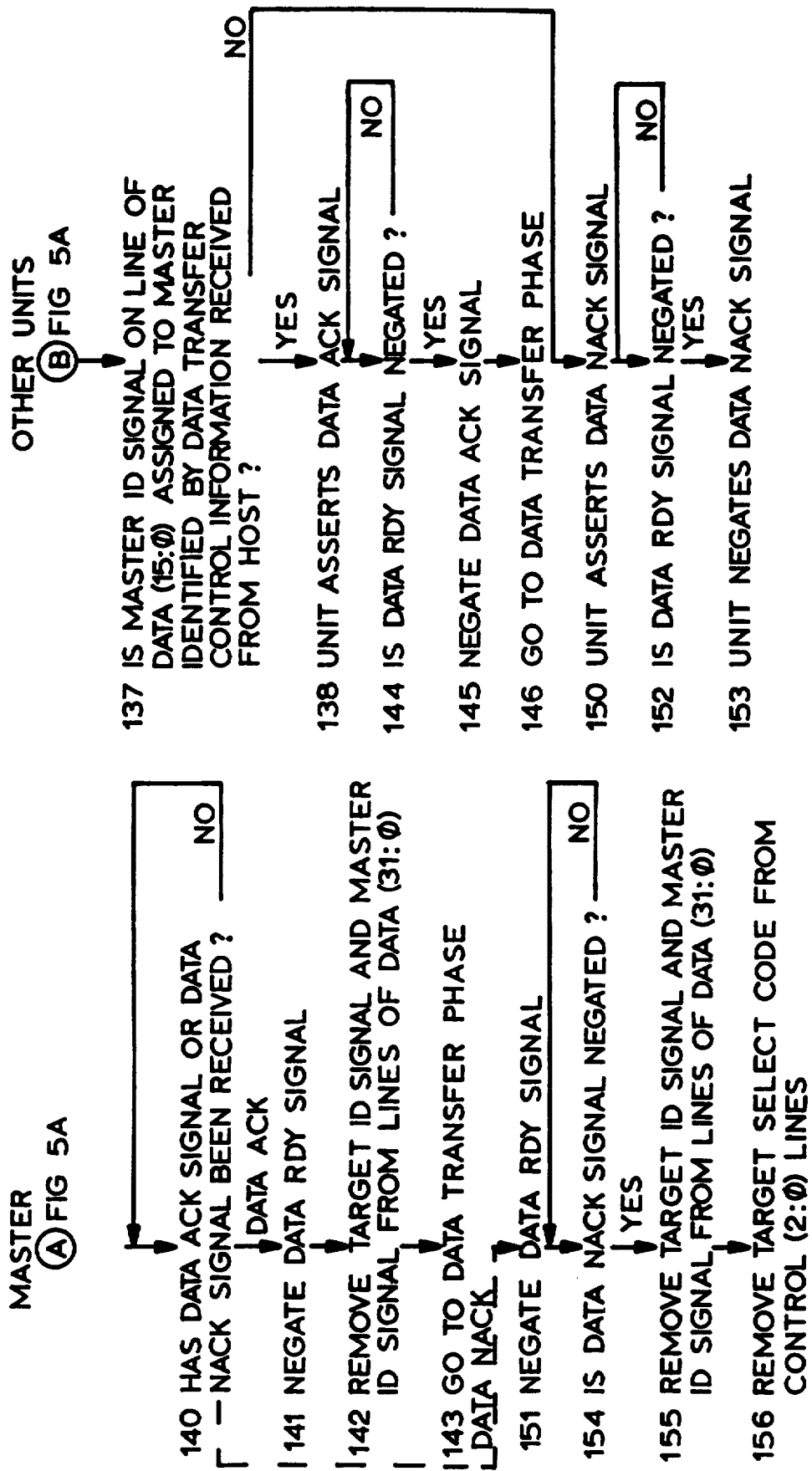

On the other hand, if a unit determines in step 136 that its one of lines 63 assigned to the DATA (31:16) signals is energized, it becomes the target unit and sequences to step 137 (FIG. 5B). In step 137, the target unit determines whether it has been enabled by the host 11 to engage in a data transfer operation with the master unit identified by the one of lines 63 assigned to the DATA (15:0) signals that is energized. If so, the unit becomes the slave unit, and asserts the DATA ACK data acknowledgement signal (step 138).

As noted above, after asserting the DATA RDY data ready signal (step 133; FIG. 5A) the master unit waits for a response from a target unit. One response is the assertion of the DATA ACK data acknowledgement signal. If the master unit receives the asserted DATA ACK data acknowledgement signal (step 140; FIG. 5B), it negates the DATA RDY data ready signal (step 142). The target unit, after asserting in step 138 the DATA ACK data acknowledgement signal, waits for the negation of the DATA RDY data ready signal (step 144), in response to which it negates the DATA ACK data acknowledgement signal (step 145) and goes to the data transfer phase. The master unit will then remove the target unit and master unit identification signals from respective lines 63 assigned to the DATA (31:0) signals, and goes to the data transfer phase (step 143)

Returning to step 137, if the target unit determines that it was not enabled by the host 11 to engage in a data transfer operation with the master unit identified by the one of the lines 63 assigned to the DATA (15:0) signals that is energized, it sequences to step 150, in which it asserts the DATA NACK data non-acknowledgement signal. If the master unit, in step 140 receives the DATA NACK data non-acknowledgement signal, it negates the DATA RDY data ready signal (step 151). Following assertion of the DATA NACK data non-acknowledgement signal, the target unit monitors the condition of the DATA RDY data ready signal on line 66 (step 152). When the master unit negates the DATA RDY data ready signal in step 151, the target unit negates the DATA NACK data non-acknowledgement signal (step 153).

After negating the DATA RDY data ready signal in step 151, the master unit monitors the condition of the line 71 (FIG. 3) to determine when the DATA NACK data non-acknowledgement signal is negated (step 154). The master unit will then remove the target unit identification signal and master unit identification signals from respective lines assigned to the DATA (31:0) signals (step 155) and the CTRL (2:0) control signals comprising the target select code from the control lines 65 (step 156). The master unit will then return to the arbitrate phase.

Returning to steps 132 and 133 (FIG. 5A) it will be appreciated that the master unit may also implement a timer (not shown) that it starts after asserting the DATA RDY data ready signal. If the master unit does not receive an asserted DATA ACK data acknowledgement signal or an asserted DATA NACK data non-acknowledgment signal before the timer times out, it may perform the operation described in connection with steps 151 and 154 through 156 to terminate the target select phase. Thereafter, the master unit may signal an error condition to the host 11.

Figure 4B:
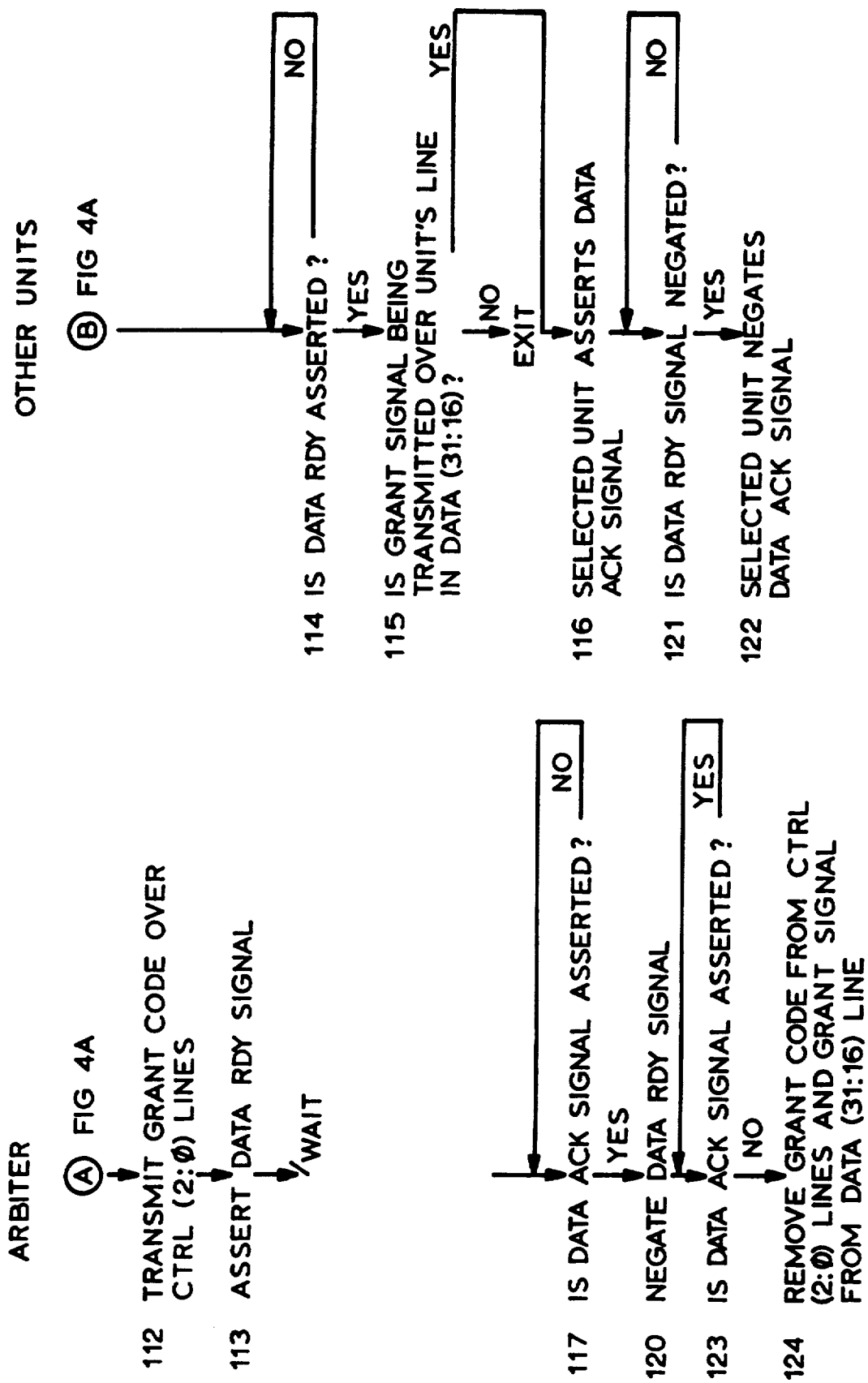

The removal of the signals from the control lines 65 in step 153 indicates that the input/output data transfer bus 24 is idle, and in response thereto the arbiter initiates another arbitration operation (FIGS. 4A and 4B).

Figure 6B:
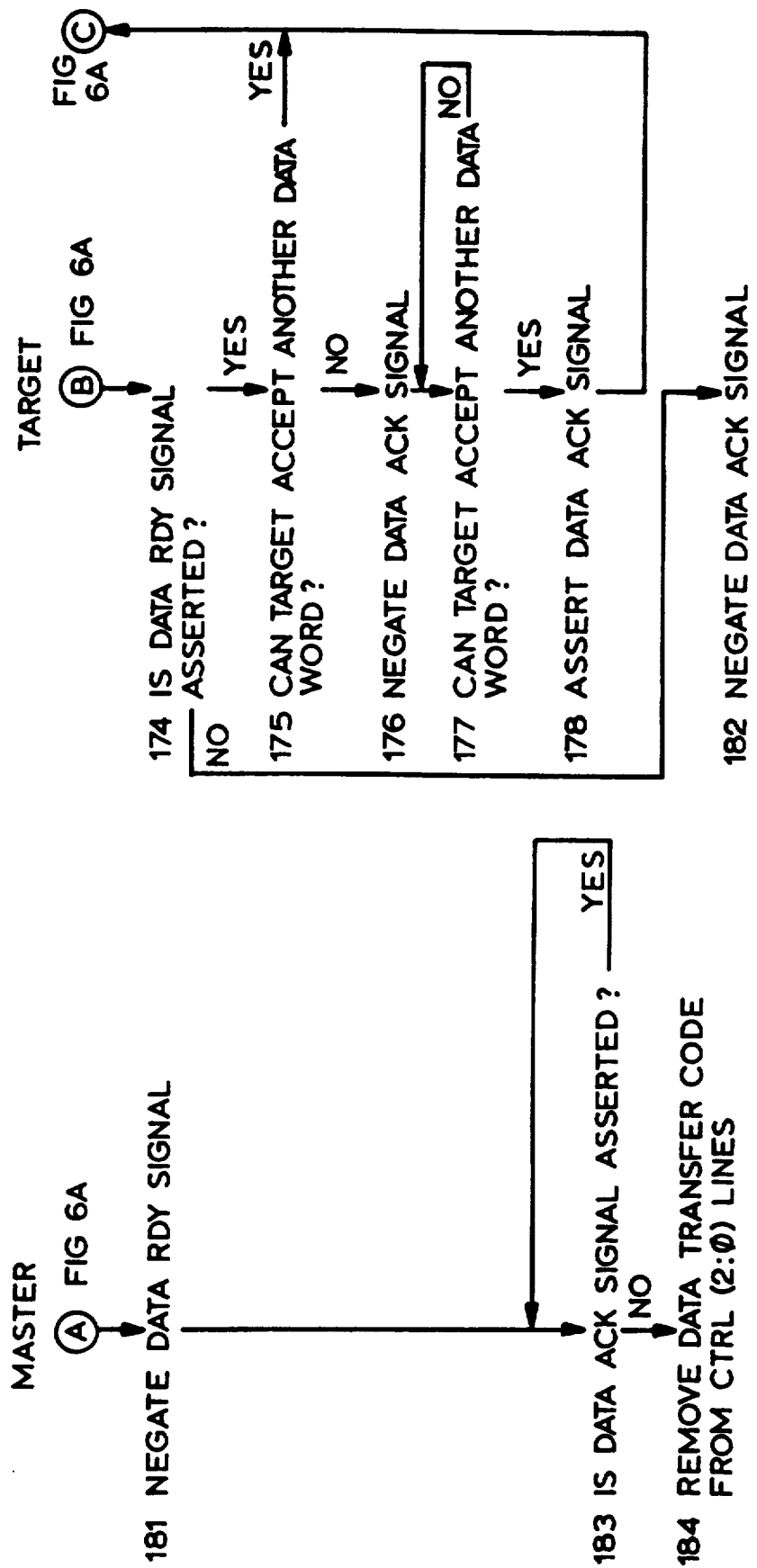

During the data transfer phase, which is depicted in FIGS. 6A and 6B, the master unit and slave unit, which have been selected during the arbitration and target select phases, respectively, actually transfer the data over the input/output data transfer bus 24. With reference to FIG. 6A, the master unit initially transmits CTRL (2:0) control signals comprising a data transfer code over the lines 65 (step 160), and asserts the DATA RDY data ready signal on line 66 (step 161). If the slave unit detects that the CTRL (2:0) control signals comprise the data transfer code (step 162) and that the DATA RDY data ready signal is asserted (step 163), when it is able to transfer data, it asserts the DATA ACK data acknowledgement signal (step 164).

When the master unit determines that the DATA ACK data acknowledgement signal is asserted (step 165), it iteratively transmits data words and corresponding EDC (error detection code) words over lines 63 and 64, respectively (step 166). With each transmission, the master unit pulses the DATA STROBE signal on line 67 (steps 167 and 171). In response to the assertion of the DATA STROBE signal (step 168), the slave unit strobes the data word and the EDC word on the respective lines 63 and 64 (step 170). If the master unit has additional data to send, it returns to step 165 to again test the condition of the DATA ACK data acknowledgement signal from the slave unit, before transmitting another data and EDC word.

After receiving a data and corresponding EDC word (step 170), the slave unit determines whether it is temporarily unable to receive an additional word, and if so negates the DATA ACK data acknowledgement signal to delay transmission by the master unit (steps 174 through 178). In particular, the slave unit first tests the DATA RDY data ready signal to determine whether it is asserted (step 174); if it is not, the master has finished the data transfer operation and so no delay is required. If the DATA RDY data ready signal is asserted, indicating that the master unit has additional data to transmit, the slave unit determines whether it is temporarily unable to receive additional words (step 175). If not, it returns to step 168 to receive the words over the data and EDC lines 63 and 64.

On the other hand, if the slave unit determines in step 175 that it is temporarily unable to receive additional words, it sequences to step 176, in which it negates the DATA ACK data acknowledgement signal. This may occur, for example, if the slave unit determines that a buffer (not shown) which it uses to temporarily store received data and EDC words may overflow. As described above (step 165), in response to negation by the slave unit of the DATA ACK data acknowledgement signal, the master unit temporarily stops sending the words. The slave unit maintains the DATA ACK data acknowledgement signal negated until it can accept another data word (step 177), at which time it again asserts the DATA ACK data acknowledgement signal. At that point (see step 165), the master unit resumes transmitting data and EDC words. Accordingly, the slave unit uses the condition of the DATA ACK data acknowledgement signal to control the flow of data and EDC words thereto.

When the master unit determines, in step 172, that it is finished transferring data and EDC words, it sequences to step 181, in which it negates the DATA RDY data ready signal. The slave unit, in step 174, determines that the DATA RDY signal is negated, and in response negates the DATA ACK data acknowledgement signal (step 182). When the master unit thereafter detects that the slave unit has negated the DATA ACK data acknowledge signal (step 183), it removes the CTRL (2:0) control signals defining the data transfer code from the control lines 65 (step 184), thereby indicating that the input/output data transfer bus 24 is in the idle condition. The arbiter unit may thereafter initiate a further arbitration operation (FIGS. 4A and 4B).

It will be appreciated that the data transfer arrangement provides a number of advantages. For example, it provides for enhanced flexibility of data transfer between a plurality of arrays and input/output systems, such as the mass data stores 13 and frame buffers 14. In addition, the arrangement provides for transferring large blocks of data, which are often required for processing by a processor array 12, since the master can keep transferring data (as described in connection with FIGS. 6A and 6B) as long as it maintains the appropriate data transfer code on the control lines 65 and the DATA RDY data ready signal asserted on line 66. Furthermore, the arrangement facilitates efficient usage by a number of units connected to the input/output data transfer bus 24, while minimizing the number of control lines in the bus.

While the data transfer arrangement has been described as having a separate input/output command bus 25, it will be appreciated that command information can be transmitted over the input/output data transfer bus 24 using a phase similar to the data transfer phase described above (FIGS. 6A and 6B). A command transfer can occur, for example, by having a command target selection phase, similar to the target selection phase described in connection with FIGS. 5A and 5B, but without having the target perform steps 137 and 138 (the master verification steps). Thereafter, the master can transmit, during a phase similar to the data transfer phase signals over lines 63 comprising a command packet. The command packet will have the structure as determined by the particular selected target. The command transfer as described here can substitute for the input/output initiation phase described in FIG. 2, and the units, along with other units connected to the input/output data transfer bus, can thereafter arbitrate for the bus as described in FIG. 2.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data processing system comprising a plurality of units interconnected by a bus and a host for issuing commands, including data transfer commands, to said units to initiate a data transfer operation, each unit comprising:

A. information transfer means for transmitting and receiving information signals, including arbitration, target select and data signals, over information transfer lines of the bus;

B. cycle identifier transfer means for transmitting and receiving cycle identifier signals over cycle identifier lines of the bus; and C. transfer control means connected to the information transfer means and the cycle identifier transfer means for enabling a data transfer during a data transfer operation in a plurality of phases, including an arbitration phase, a target selection phase and a data transfer phase, each identified by a unique encoding of the cycle identifier signals, the transfer control means:

(i) enabling the information transfer means to transfer over the information transfer lines arbitration signals during the arbitration phase of a data transfer operation in response to receipt of a data transfer command from said host and receipt of cycle identifier signals identifying an arbitration operation by the cycle identifier transfer means to thereby engage in an arbitration operation during which a unit is identified as a master unit selected to engage in a transfer operation over the bus;

(ii) during the target selection phase of a data transfer operation selectively (a) enabling the information transfer means to transfer over the information transfer lines target select signals identifying another unit as a target unit, and the cycle identifier transfer means to transfer cycle identifier signals over the cycle identifier lines if the unit is identified as the master unit during the arbitration phase, or (b) if the unit is not identified as the master unit during the arbitration phase and in response to receipt by the cycle identifier means of cycle control signals identifying the target select phase, enabling the information transfer means to receive target select signals and determine whether they identify it as a target unit for the transfer operation; and (iii) during the data transfer phase of a data transfer operation, if the unit was identified as a master unit during the arbitration phase or a target unit during the target selection phase, enabling the information transfer means to transfer data signals representing a series of data words as determined in the data transfer command, and if the unit was identified as a master unit further enabling the cycle identifier transfer means to transfer cycle identifier signals identifying the data transfer phase.

2. A data processing system as defined in claim 1 in which said information transfer lines include a plurality of information signal transfer lines, each unit's information transfer means transmitting as its arbitration signals a signal over a unique one of said information transfer lines in response to said transfer control means.

3. A data processing system as defined in claim 2 further comprising an arbiter unit connected to said bus, said arbiter unit transmitting cycle identifier signals comprising a code identifying said arbitration operation to initiate said arbitration operation over said cycle identifier lines, said arbiter unit receiving the arbitration signals from said information transfer lines and generating a grant signal for transmission over said information transfer lines to enable a selected one of said units to initiate said target select operation, said arbiter unit thereafter removing the code identifying the arbitration operation from said cycle identifier lines.

4. A data processing system as defined in claim 3 in which each unit has a unique unit identification code, the transfer control means of the selected unit enabling its information transfer means to transmit over the information transfer lines its unit identification code as a master identification code and the unit identification code of another unit to engage in the data transfer operation as a target identification code during the target select phase.

5. A data processing system as defined in claim 4 in which the transfer control means of the selected unit further enables its cycle identifier transfer means to transmit cycle identifier signals over the cycle identifier lines identifying the target select phase.

6. A data processing system as defined in claim 5 in which, for each of the other units:
A. the information transfer means receives the master identification code and the target identification code from the information transfer lines;
B. the cycle identifier transfer means receive said cycle identifier signals and determine if they identify the target select phase, and
C. the transfer control means, in response to a positive determination by said the cycle identifier transfer means, determines whether the target identification code corresponds to its unit identification code.

7. A data processing system as defined in claim 6 in which, in response to a positive determination by said transfer control means, the transfer control means enables the information transfer means to transmit an acknowledgement over said bus, the transfer control means of the selected unit thereafter enabling the cycle identifier transfer means to remove the cycle identifier signals identifying the target phase from said cycle identifier lines.

8. A data processing system as defined in claim 7 in which:
A. the transfer control means of said selected unit, after enabling the cycle identifier transfer means to remove the cycle identifier signals identifying the target phase from said cycle identifier lines, enables:
i. the cycle identifier transfer means to transmit cycle identifier signals over said cycle identifier lines identifying a data transfer phase, and
ii. the information transfer means to transfer data over said information transfer lines to thereby perform the data transfer, and
B. the cycle identifier transfer means of said target unit receives said cycle identifier signals identifying the data transfer phase and enables its transfer control means to, in turn, enable its information transfer means to participate in the data transfer.

9. A unit for connection to a data processing system including a plurality of units interconnected by a bus, said plurality of units also being connected to a host for issuing commands, including data transfer commands to said plurality of units to initiate a data transfer operation, said unit comprising:
A. information transfer means for transmitting and receiving information signals, including arbitration, target select and data signals, over information transfer lines of the bus;
B. cycle identifier transfer means for transmitting and receiving cycle identifier signals over cycle identifier lines of the bus; and
C. transfer control means connected to the information transfer means and the cycle identifier transfer means for enabling a data transfer during a data transfer operation in a plurality of phases, including an arbitration phase, a target selection phase and a data transfer phase, each identified by a unique encoding of the cycle identifier signals, the transfer control means:
(i) enabling the information transfer means to transfer over the information transfer lines arbitration signals during the arbitration phase of a data transfer operation in response to receipt of a data transfer command from said host and receipt of cycle identifier signals identifying an arbitration operation by the cycle identifier transfer means to thereby engage in an arbitration operation during which one of the plurality of units is identified as a master unit selected to engage in a transfer operation over the bus;
(ii) during the target selection phase of a data transfer operation selectively (a) enabling the information transfer means to transfer over the information transfer lines target select signals identifying another unit as a target unit, and the cycle identifier transfer means to transfer cycle identifier signals over the cycle identifier lines if the unit is identified as the master unit during the arbitration phase, or (b) if the unit is not identified as the master unit during the arbitration phase and in response to receipt by the cycle identifier means of cycle control signals identifying the target select phase, enabling the information transfer means to receive target select signals and determine whether they identify it as a target unit; and (iii) during the data transfer phase of a data transfer operation, if the unit was identified as a master unit during the arbitration phase or a target unit during the target selection phase, enabling the information transfer means to transfer data signals representing a series of data words as determined in the data transfer command, and if the unit was identified as a master unit further enabling the cycle identifier transfer means to transfer cycle identifier signals identifying the data transfer phase.

10. A unit as defined in claim 9 in which said information transfer lines include a plurality of information signal transfer lines, said information transfer means transmitting as the unit's arbitration signals a signal over a unique one of said information transfer lines in response to said transfer control means.

11. A unit as defined in claim 10 in which the transfer control means,
A. in response to receipt by said cycle identifier transfer means of cycle identifier signals comprising a code identifying said arbitration operation, enables said information transfer means to transfer said unit's arbitration signal as part of said arbitration operation over said cycle identifier lines and
B. said information transfer means to receive said grant signal from said information transfer lines.

12. A unit as defined in claim 11 in which each unit has a unique unit identification code, the transfer control means, in response to receipt of said grant signal enabling its information transfer means to transmit over the information transfer lines its unit identification code as a master identification code and the unit identification code of another unit to engage in the data transfer operation as a target identification code during the target select phase.

13. A unit as defined in claim 12 in which the transfer control means, in response to receipt of the grant signal, further enables its cycle identifier transfer means to transmit cycle identifier signals over the cycle identifier lines identifying the target select phase.

14. A unit as defined in claim 13 in which:
A. the information transfer means receives the master identification code and the target identification code from the information transfer lines;
B. the cycle identifier transfer means receive said cycle identifier signals and determine if they identify the target select phase, and
C. the transfer control means, in response to a positive determination by said the cycle identifier transfer means, determines whether the target identification code corresponds to its unit identification code.

15. A unit as defined in claim 14 in which, in response to a positive determination by said transfer control means, the transfer control means enables the information transfer means to transmit an acknowledgement over said bus, the transfer control means of the selected unit thereafter enabling the cycle identifier transfer means to remove the cycle identifier signals identifying the target phase from said cycle identifier lines.

16. A unit as defined in claim 15 in which the transfer control means, in response to receipt of the grant signal, after enabling the cycle identifier transfer means to remove the cycle identifier signals identifying the target phase from said cycle identifier lines, enables:
A. the cycle identifier transfer means to transmit cycle identifier signals over said cycle identifier lines identifying a data transfer phase, and
B. the information transfer means to transfer data over said information transfer lines to thereby perform the data transfer.

* * * * *